(12) United States Patent
Flood et al.

(10) Patent No.: US 6,794,608 B2
(45) Date of Patent: Sep. 21, 2004

(54) WELDING CURRENT CONTROL SYSTEM AND METHOD

(75) Inventors: Dale A. Flood, El Dorado Hills, CA (US); Ronald R. Rothermel, Pollock Pines, CA (US)

(73) Assignee: Tri Tool Inc., Rancho Cordova, CA (US)

( * ) Notice: Subject to any disclaimer, the term of this patent is extended or adjusted under 35 U.S.C. 154(b) by 211 days.

(21) Appl. No.: 09/984,559

(22) Filed: Oct. 30, 2001

(65) Prior Publication Data

US 2003/0080101 A1 May 1, 2003

(51) Int. Cl.$^7$ ................................................. B23K 9/09
(52) U.S. Cl. ........................ 219/130.51; 219/130.21; 219/130.31
(58) Field of Search ...................... 219/137 PS, 130.21, 219/130.31, 130.32, 130.33, 130.51, 130.5

(56) References Cited

U.S. PATENT DOCUMENTS

| | | |
|---|---|---|
| 3,689,734 A | 9/1972 | Burley et al. |
| 3,792,225 A | 2/1974 | Needham et al. |
| 3,809,853 A | 5/1974 | Manz |
| 3,838,244 A | 9/1974 | Petrides et al. |
| 4,019,016 A | 4/1977 | Friedman et al. |
| 4,020,320 A | 4/1977 | Pijls et al. |
| 4,189,765 A | 2/1980 | Kotalik et al. |
| 4,300,035 A | 11/1981 | Johansson |
| 4,319,124 A | 3/1982 | Johansson |
| 4,390,954 A | 6/1983 | Manning |
| 4,427,874 A | 1/1984 | Tabata et al. |
| 4,544,826 A | 10/1985 | Nakanishi et al. |
| 4,546,234 A | 10/1985 | Ogasawara et al. |
| 4,561,059 A | 12/1985 | Davis et al. |
| 4,650,957 A | 3/1987 | Cullen et al. |
| 4,717,807 A | 1/1988 | Parks et al. |
| 4,835,360 A | 5/1989 | Parks et al. |
| 4,866,247 A | 9/1989 | Parks et al. |
| 4,897,523 A | 1/1990 | Parks et al. |
| 4,954,691 A | 9/1990 | Parks et al. |
| 4,972,064 A | 11/1990 | Stava |
| 4,973,814 A | 11/1990 | Kojima et al. |
| 5,001,326 A | 3/1991 | Stava |
| 5,003,154 A | 3/1991 | Parks et al. |
| 5,148,001 A | 9/1992 | Stava |
| 5,157,236 A * | 10/1992 | Batzler et al. .......... 219/137 PS |
| 5,225,660 A * | 7/1993 | Mita et al. ............. 219/137 PS |
| 5,278,390 A | 1/1994 | Blankenship |
| 5,571,431 A | 11/1996 | Lantieri et al. |
| 5,824,991 A * | 10/1998 | Mita et al. ............. 219/130.21 |
| 5,834,732 A * | 11/1998 | Innami et al. ......... 219/130.31 |
| 5,961,863 A | 10/1999 | Stava |
| 6,002,104 A | 12/1999 | Hsu |

* cited by examiner

*Primary Examiner*—Clifford C. Shaw
(74) *Attorney, Agent, or Firm*—Bacon & Thomas, PLLC

(57) ABSTRACT

A system and method for controlling a weld-current in an arc welding apparatus involves programming of a waveform generator to supply a control signal to a weld-current power supply, the control signal being derived from a reference waveform consisting of selected segments having fixed or predetermined amplitudes and variable durations. The reference waveform may be dynamically adjusted in response to changes in welding conditions by feeding the output of an arc current and/or voltage detector back to the waveform generator and varying the duration of selected predetermined amplitude segments.

54 Claims, 6 Drawing Sheets

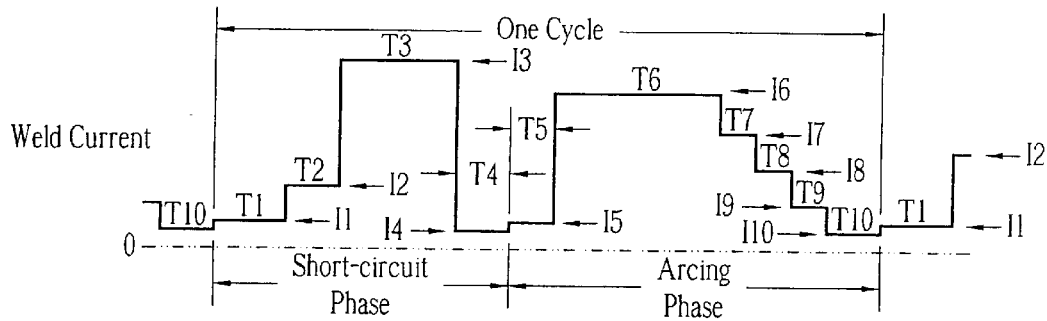
FIG.2
| Segment Number | Current (Amps) | Time (msec) | Trigger |
|---|---|---|---|
| 1 | I1 | T1 | T10 (completion) |
| 2 | I2 | T2 | Prior |
| 3 | I3 | T3 | Prior |
| 4 | I4 | T4 | Prior |
| 5 | I5 | T5 | Prior |
| 6 | I6 | T6 | Prior |
| 7 | I7 | T7 | Prior |
| 8 | I8 | T8 | Prior |
| 9 | I9 | T9 | Prior |
| 10 | I10 | T10 | Prior |
FIG.3
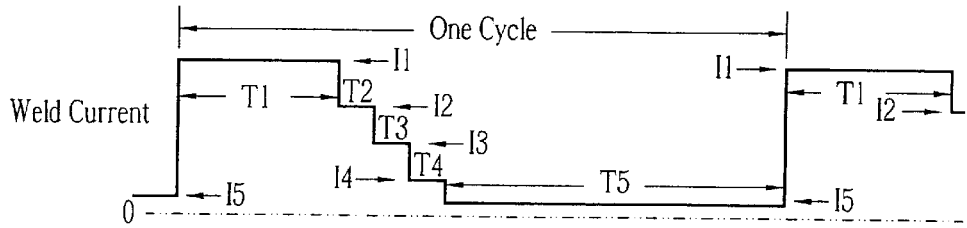
FIG.4
| Segment Number | Current (Amps) | Time (msec) | Trigger |
|---|---|---|---|
| 1 | I1 | T1 | T5 (completion) |
| 2 | I2 | T2 | Prior |
| 3 | I3 | T3 | Prior |
| 4 | I4 | T4 | Prior |
| 5 | I5 | T5 | Prior |
FIG.5

Table 2 – Enhancement 1

| Segment Number | Current (Amps) | Time (msec) | Trigger |
|---|---|---|---|
| 1 | I1 | T1 | SC |
| 2 | I2 | T2 | Prior |
| 3 | I3 | T3 | Prior |
| 4 | I4 | T4 | Prior |
| 5 | I5 | T5 | Prior |
| 6 | I6 | T6 | Prior |
| 7 | I7 | T7 | Prior |
| 8 | I8 | T8 | Prior |
| 9 | I9 | T9 | Prior |
| 10 | I10 | SCD | Prior |

Table 3 -- Enhancement 3

| Segment Number | Current (Amps) | Time (msec) | Trigger |
|---|---|---|---|
| 1 | I1 | T1 | SC |
| 2 | I2 | T2 | Prior |
| 3 | I3 | T3 or TED | Prior |
| 4 | I4 | T4, RAD, or TFR | Prior or TE-T4 |
| 5 | I5 | T5 | Prior, RA, or TFR |
| 6 | I6 | T6 | Prior |
| 7 | I7 | T7 | Prior |
| 8 | I8 | T8 | Prior |
| 9 | I9 | T9 | Prior |
| 10 | I10 | SCD | Prior |

| Segment Number | Current (Amps) | Time (msec) | Trigger | Distance Control Voltage(Volts) |
|---|---|---|---|---|
| 1 | I1 | T1 | SC | OFF |
| 2 | I2 | T2 | Prior | OFF |
| 3 | I3 | T3 or TED | Prior | OFF |
| 4 | I4 | T4, RAD, or TFR | Prior or TE-T4 | OFF |
| 5 | I5 | T5 | Prior, RA, or TFR | OFF |
| 6 | I6 | T6 | Prior | V6 |
| 7 | I7 | T7 | Prior | OFF |
| 8 | I8 | T8 | Prior | OFF |
| 9 | I9 | T9 | Prior | OFF |
| 10 | I10 | SCD | Prior | OFF |

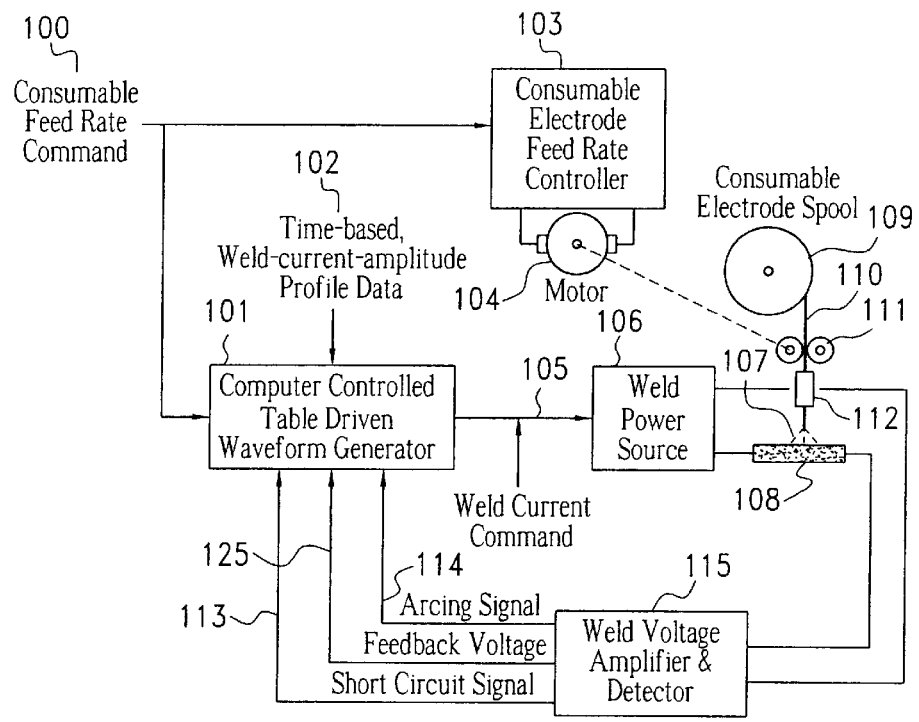
FIG.12
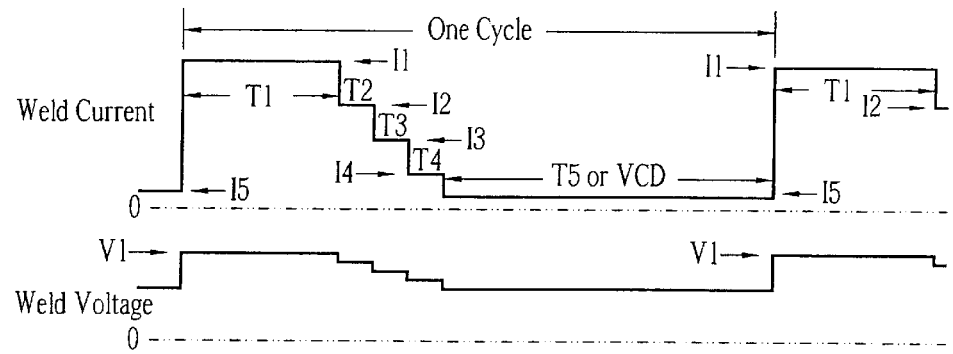
FIG.13
Table 5 — Enhancement 8 for Pulsed-spray Processes
| Segment Number | Current (Amps) | Time (msec) | Trigger | Weld Voltage (Volts) |
|---|---|---|---|---|
| 1 | I1 | T1 | VCD | V1 |
| 2 | I2 | T2 | Prior | OFF |
| 3 | I3 | T3 | Prior | OFF |
| 4 | I4 | T4 | Prior | OFF |
| 5 | I5 | T5 or VCD | Prior | OFF |
FIG.14

WELDING CURRENT CONTROL SYSTEM AND METHOD

BACKGROUND OF THE INVENTION

1. Field of the Invention

This invention generally relates to a system and method of controlling a weld current for use in arc welding processes, and more particularly to a software-based system and method which permits generation of a wide variety of weld current profiles, including weld current profiles that can dynamically adapt to changes in welding conditions simply by changing the timing of segments of the weld current profile having predetermined (but not necessarily constant) amplitude profiles.

Unlike prior systems utilizing waveform generation to control a weld current power supply, the waveform generation system and method of the invention requires neither conventional hardware-implemented arc current or voltage feedback loops, nor complex digital signal processor-based controllers.

The reference waveforms used to generate the weld current profiles may be in the form of tables containing amplitude and trigger or duration values for each segment of the waveform. The waveforms may either be applied without feedback directly to the weld current power supply, or digitally modified based on feedback from an arc current and/or voltage sensor. Modification of the profiles is carried out by modifying a trigger or duration parameter for a selected amplitude segment in the table used to represent the reference waveform, preferably based on current and/or voltage data gathered over multiple weld cycles, simplifying programming and reducing required processor resources.

Despite its simplicity, the software-based weld current control of the invention can carry-out, without limitation, any of the following relatively complex weld-current control functions:

in short-arc welding, synchronizing of the waveform to the start of a short circuit, in short-arc welding, re-starting the short circuit portion of the waveform if premature re-arcing occurs and/or if the re-establishment of another short circuit is detected, indicating that the original short circuit was only an incipient short, in short-arc welding, adjusting the duration of the short-circuit phase based on analysis of previous cycles, including adjustment to prevent stub-outs if re-arcing fails to occur, in any consumable electrode process, generating a current amplitude profile for each of a plurality of electrode diameters, feed-rates, material types and welding gas types, in any consumable electrode process, interpolating between previously generated current amplitude profiles for different electrode feed-rates to facilitate operation at electrode feed-rates other than those associated with a particular amplitude profile or table, and in any pulsed arc process, using the software to also provide synchronized sensing and control of the torch-to-workpiece voltage by adjusting the torch-to-workpiece distance or, in pulsed arc consumable electrode processes only, using the software to provide synchronized sensing and control the torch-to-workpiece voltage by adjusting the duration of any one of the current amplitude segments.

It will of course be appreciated by those skilled in the art that the system and method of the invention may be applied to welding processes other than those specified above, including all types of manual, semiautomatic, and automatic welding, as well as all types of out-of-position and pipe welding processes.

2. Description of Related Art

In recent years, substantial effort has been devoted to improving control of weld currents in arc welding systems. Until recently, most of this effort has involved design of ever more sophisticated feedback circuits which modulate the output of the weld current generator in response to changes in currents or voltages measured between the electrode and the workpiece. With the development of improved microprocessors, however, attempts have been made to digitize many welding control functions, including control of the arc welding current. Transfer of hardware-implemented functions to software has the advantage of enabling a particular apparatus to be adapted for a greater variety of different welding processes or conditions, without the need to design specific circuits for each change in the welding sequence.

U.S. Pat. No. 4,973,814 illustrates a microprocessor-based weld current controller which, like the present invention, uses pre-determined reference waveforms as a basis for control of a weld current power supply. However, the output of the waveform generator described in this patent is applied as the command signal to a current amplitude feedback loop of the welding apparatus, rather than directly to the power supply, the current amplitude feedback loop including a comparator for comparing the applied waveform to the actual waveform and generating an error signal. The only adjustments made to the waveform itself are made through a display of the difference between the reference and actual waveforms, and a keyboard for adjusting the applied reference waveform as necessary to achieve a desired actual waveform.

In the system illustrated in U.S. Pat. No. 4,973,814, only the amplitude and not the duration of the various parts of the weld current cycle are dynamically adjusted, and the adjustment is carried out by an analog servo, rather than by modifying the reference waveform. Adjustment of the reference waveform can only be carried out manually. As a result, while systems of the type illustrated in this patent can, through the analog servo, provide automatic control of a relatively simple and stable weld cycle, once the appropriate waveform has been manually adjusted, they cannot be used to provide automatic control for welding processes that are highly dependent on the timing of events that occur during the cycle, such as short-circuit arc welding, in which the cycle consists of at least two segments of variable length.

U.S. Pat. No. 5,278,390, on the other hand, discloses a version of the controller disclosed in U.S. Pat. No. 4,973,814, in which the hardware-implemented closed loop servo function is transferred to a digital signal processor capable of modifying the reference "waveform" expressed in a "state table." In the system disclosed in this patent, the current profile is stored in state tables that can be selected for a particular weld process. Feedback is achieved, as explained in col. 13, lines 13 et seq. of U.S. Pat. No. 5,278,390, by manipulating the current amplitude values contained in the active state table, resulting in a modified waveform which is applied to the output of a weld current power source.

The system disclosed in U.S. Pat. No. 5,278,390, which takes what may be referred to as a "brute force" approach to feedback, appears to be capable of controlling a wide variety of welding processes, but suffers from the disadvantages that the response to current or voltage feedback values must be separately programmed for each part of the current cycle, and the closed loop control circuit must be adaptable enough to recognize and respond appropriately to each different part of the weld cycle by continually adjusting the current amplitude values according to the different requirements for each portion of the weld current cycle. In a highly variable environment such a short-circuit arc welding system, without the assistance of hardware-based feedback loops, the current amplitude control circuit of U.S. Pat. No. 5,278,390 would essentially be required to re-write the state table during each cycle, with the weld current profile essentially being determined by programming of the controller rather than of the state table.

The present invention, in contrast, does not attempt to instantaneously modify a waveform to conform to changes in sensed arc voltage or current, but rather takes a simpler and yet more universally adaptable approach in which the waveform is divided into predetermined amplitude segments, and only the timing of the segments is varied, thereby eliminating the need to continually adjust amplitude values for each weld cycle.

In a sense, the invention is based on recognition that, for cyclical welding processes, differences in amplitude between a desired current profile and an actual profile result from differences in the timing of parts of the cycle. For example, in a short-circuit arc welding cycle, the establishment of a short circuit is followed by an increase in the weld current. If the short-circuit is established early, a control circuit of the type disclosed in U.S. Pat. No. 5,278,390 would need to almost instantaneously determine that a short-circuit had been established and change all of the corresponding amplitude values in the state table accordingly. The system and method of the invention, on the other hand, can respond to establishment of the short-circuit simply by triggering a short circuit segment of the current profile, without having to change current amplitude values, which are presumed to be the same from one short-circuit cycle to the next. A more complex short-circuit current profile having six or more segments, such as the ones described in U.S. Pat. Nos. 4,544,826; 4,546,234; 4,717,807; 4,835,360; 4,866,247; 4,897,523; 4,954,691; 4,972,064; 5,003,154; 5,148,001; and 5,961,863, would be very difficult to implement using adjustment of state table current amplitude values, whereas a programmer utilizing the present invention would simply need to select an appropriate current amplitude profile, and program appropriate triggers for any duration variable segments in the profile.

As evidence of the intractability of the state-table approach taken in U.S. Pat. No. 5,278,390, a later patent by the same assignee, U.S. Pat. No. 6,002,104, essentially abandons the concept of using software to achieve automatic real-time control of a complex waveform, such as the waveform required to minimize splatter during short-circuit arc welding, and instead utilizes a sophisticated "microprocessor based real-time control and monitor to enable real time manual adjustment of a short circuit arc welding current," i.e., to enable a human controller to adjust the welding current during the welding process. Other systems that provide for real-time manual adjustment of welding parameters are disclosed in U.S. Pat. Nos. 5,571,431, 4,390,954, and 4,189,765.

Besides U.S. Pat. No. 5,278,390, the only other patent known to the inventors that is directed to software-based control of a welding arc using a periodic reference waveform without the need for manual intervention is U.S. Pat. No. 4,650,957. However, the reference waveform described in this patent is not applied to the weld-current power supply, but rather is applied to a torch-to-workpiece distance controller, and thus has limited applicability. While numerous other software-based arc voltage or current controllers have previously been disclosed, including the one described in U.S. Pat. No. 3,838,244, which dates back to 1968, none of the controllers described in these patents use periodic reference waveforms, much less a table-driven waveform generator, to control the weld current. Examples of such patents include U.S. Pat. Nos. 4,019,016, 3,838,244, and 3,689,734, which disclose digital controllers that provide pre-programmed digital control of current or arc voltage levels in synchronism with movement of a welder along a carriage and a track, U.S. Pat. No. 4,561,059, which is directed to digital control of welding power supply to achieve constant current. While a constant-current controller might use software to adjust the weld current, there is no need to initially generate a waveform or to adjust the duration of portions of the waveform based on detected currents.

In summary, none of the patents discussed above discloses the concept of controlling a weld-current by applying to the weld-current power supply a current profile consisting of a time sequence of amplitude segments, and of using software to adjust the weld-current solely by modifying the timing of individual segments in the current profile, without adjusting amplitudes of the individual segments, based on feedback of the actual weld-current (or voltage or power/energy), whether in real time or based on data obtained from previous cycles. Previous waveform-based approaches to automatic weld current control, such as the ones described in U.S. Pat. Nos. 4,973,814 and 5,278,390, have relied on application of a fixed but manually adjustable waveform to an analog hardware-implemented current amplitude servo, or a state table approach that requires continuous adjustment of current amplitude values in the table, while other waveform-based approaches, such as the one described in U.S. Pat. No. 6,002,104, do not even attempt to achieve automatic control, but rather rely entirely on operator intervention to adjust the waveform.

SUMMARY OF THE INVENTION

It is accordingly a first objective of the invention to overcome the disadvantages of prior arc welding current control systems and methods by providing a software-based arc welding current control that is easily adapted to a wide variety of welding processes, that can automatically adjust for changes in weld conditions, and yet that does not require high level programming skill and extraordinary processing power to implement.

It is a second objective of the invention to provide a software-based weld current controller that can adapt to complex, highly variable waveforms, and yet does not require operation intervention during welding.

It is a third objective of the invention to provide a more flexible, easily adapted arc welding system that can be adapted to generate complex arc welding waveforms without the need for specific feedback circuitry to control the waveforms, and yet that can also economically be adapted to generate less complex waveforms.

It is a fourth objective of the invention to provide arc welding waveform generation apparatus that can be adapted for use with short-arc, pulsed arc, and other types of consumable and non-consumable arc welding processes.

It is a fifth objective of the invention to provide waveform generation apparatus that can be adapted for use with conventional rapid-response welding power supplies to provide improved short-arc welding characteristics without the need for necking detection or the need to provide additional costly high-power switching elements to facilitate rapid current decay.

These objectives are achieved, in accordance with the principles of a preferred embodiment of the invention, by providing a system and method of controlling a weld current through the use of reference waveforms applied to the weld current power supply, and that may be dynamically modified based on current or voltage feedback to the waveform generator. Unlike prior systems utilizing waveform generation to control a weld current power supply, the waveform generation system and method of the invention requires neither conventional hardware-implemented arc current or voltage feedback loops, nor complex digital signal processor-based controllers.

The reference waveforms used to generate the weld current profiles may be in the form of tables containing amplitude and trigger or duration values for each segment of the waveform. The waveforms may either be applied without feedback directly to the weld current power supply, or digitally adjusted based on feedback from an arc current and/or voltage sensor. Adjustment of the profiles is carried out by modifying a trigger or duration parameter for a selected amplitude segment in the table used to represent the reference waveform, preferably based on current and/or voltage data gathered over multiple weld cycles, in order to simplify programming and reducing required processor resources.

In addition, according to preferred embodiments of the invention, the system and method provides for the following specific software adjustments or modification of the waveform in response to detection of the arc current or voltage:

- in short-arc welding, synchronization of the waveform to the start of short circuit,
- in short-arc welding, re-starting the short circuit portion of the waveform if premature re-arcing occurs or if re-establishment of a short circuit is detected, indicating that the short circuit was only an incipient short,
- in short-arc welding, adjusting the duration of the short-circuit phase based on analysis of previous cycles, including adjustment to prevent stub-outs if re-arcing fails to occur,
- in any consumable electrode process, generating current amplitude profiles for each of a plurality of electrode diameters, feed-rates, material types and welding gas types,
- in any consumable electrode process, interpolating between previously generated current amplitude profiles for different electrode feed-rates to facilitate operation at other electrode feed-rates, and
- in any pulsed arc process, using the software to also provide synchronized sensing and control of the torch-to-workpiece voltage by adjusting the torch-to-workpiece distance or, in pulsed arc consumable electrode processes only, using the software to provide synchronized sensing and control the torch-to-workpiece voltage by adjusting the duration of any one of the current amplitude segments.

BRIEF DESCRIPTION OF THE DRAWINGS

FIG. 2 is a short-circuit arc welding current profile generated by the waveform generator of FIG. 1.

FIG. 3 is a table of amplitude and time values corresponding to the arc welding current profile of FIG. 2.

FIG. 4 is a pulsed arc welding current profile also generated by the waveform generator of FIG. 1.

FIG. 5 is a table of amplitude and time values corresponding to the current profile of FIG. 4.

FIG. 12 is a schematic diagram of an arc welding system constructed in accordance with the principles of a third preferred embodiment of the invention.

FIG. 13 illustrates a pulsed arc welding current profile that may be generated by the system of FIG. 12, together with the corresponding arc voltage profile.

FIG. 14 is a table of amplitude and time values corresponding to the current profile of FIG. 13.

DETAILED DESCRIPTION OF THE PREFERRED EMBODIMENTS

This invention generally relates to a system and method of generating waveforms that can be used to control a weld current for use in arc welding processes, and more particularly to a system and method in which a time sequence of numbers representing amplitudes of periodic segments of the waveform is generated, and in which the time sequence thus generated is used as a reference during generation of a weld current power supply control signal.

Figure 1:
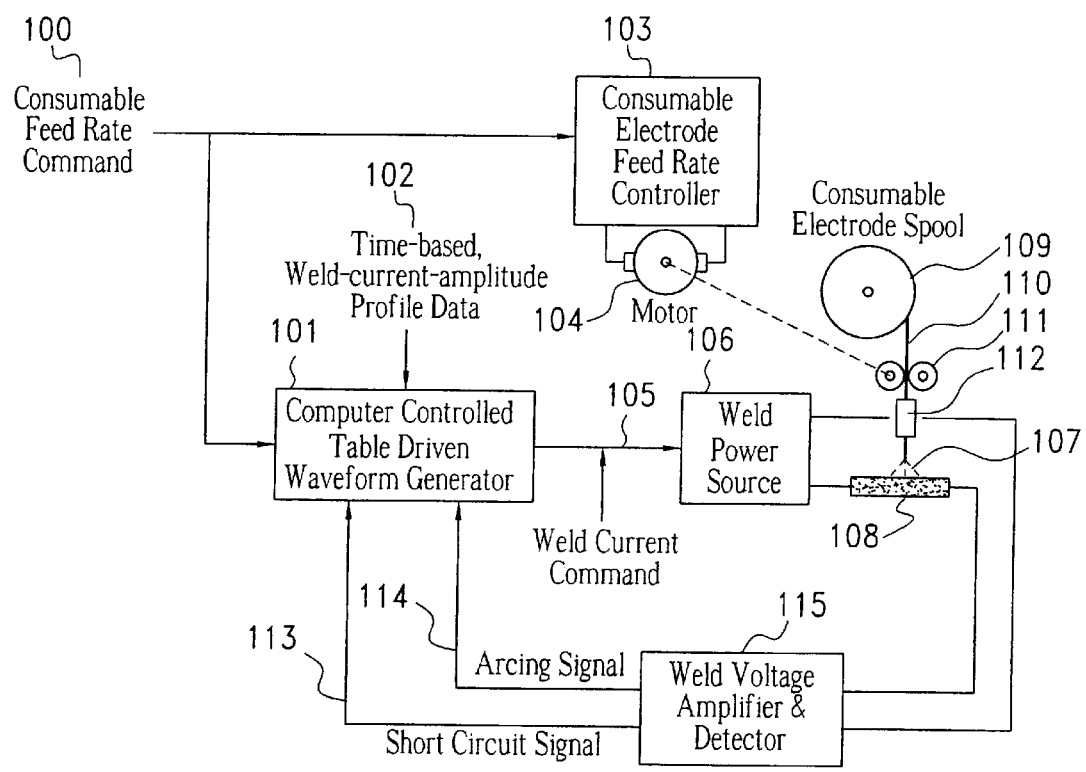
FIG. 1 is a schematic illustration of an arc welding system including a reference waveform generator constructed in accordance with the principles of a preferred embodiment of the invention.

FIG. 1 shows apparatus constructed in accordance with the principles of a first preferred embodiment of the invention to implement the system of the first preferred embodiment of the invention, in the specific context of a consumable electrode arc welding system. It will be appreciated, however, that the waveform generator of the invention is not limited to consumable electrode arc welding systems, and that the illustrated apparatus is described by way of example only.

As illustrated, the apparatus of the first preferred embodiment of the invention includes a weld power source 106 arranged to supply electric power to carry out a welding process by applying current to a sliding contact 112. Sliding contact 112 is slidingly engaged with a consumable electrode 110 to enable current to be supplied to the electrode and, due to a voltage difference between the electrode 110 and a workpiece 108, to establish an arc between the electrode and the workpiece and thereby transfer material to a weld puddle on the workpiece. The sliding contact is housed within a welding torch, which can also be used to supply welding gas(es) to shield the arc and weld puddle, as necessary.

Consumable electrode 110 is supplied from spool 109, and sliding contact 112 maintains electrical connection with the consumable electrode 110 as it is fed toward the workpiece by drive rolls 111, which in turn are driven by motor 104. Motor 104 is controlled by a consumable electrode feed-rate controller 103 to deliver the consumable electrode 110 at a rate corresponding to a consumable electrode feed-rate command 100.

In this embodiment, the weld power source 106 delivers weld current to the consumable electrode 110 in response to a weld current command signal 105 generated by a computer-controlled, table-driven waveform generator 101 in accordance with time-based weld-current profile data 102. The computer is also capable of using consumable electrode feed-rate command 100 to select and/or interpolate the appropriate weld-current profile from among a number of profiles based on the electrode feed-rate. One or more timers within the computer that controls the waveform generator 101 are used to time each segment to match the sequence and times specified in the profile data. During the segment times specified in the profile data, the computer simply sends the corresponding current amplitude to the weld power source via the weld-current command signal 105.

It will of course be appreciated that the computer-controlled table-driven waveform generator 101 may be replaced by a dedicated mixed digital-analog controller, and that the weld-current command signal 105 may be digital or analog, depending on the nature of the power source.

The waveform generator is connected to a weld voltage amplifier and detector 115, which supplies an arc ignition detection signal 114 and a short circuit signal 113 to the waveform generator. Either, both, or neither of the signals 113 and 114 may be used to generate the final current waveform, i.e., one or both of the signals could be used as a trigger for particular segments in the waveform, or the waveform can be utilized without taking into account the exact moments when a short circuit or arcing occurs.

Those skilled in the art will appreciate that numerous suitable voltage detectors are known or available, and therefore the invention is not intended to be limited to a particular construction of detector 115. For example, the short-circuit detection portion of the detector can consist, as is known, of a differential amplifier and simple threshold-voltage comparators (not shown) that output a short-circuit detection signal 113 whenever the voltage falls below a predetermined threshold indicative of a short-circuit condition. The arcing detection portion of the detector can include the same differential amplifier used for the short-circuit detector and an additional arcing threshold-voltage comparator (also not shown) set to output an arc-ignition signal 114 when a predetermined arcing voltage threshold is exceeded, the arcing threshold being greater than the short-circuit voltage and less than the open-circuit condition of the weld power source. Alternatively, re-arcing could be indicated by cessation of the short-circuit signal 113, with signal 114 being used instead to indicate the absence of an open circuit condition, or by supplying the output of the differential amplifier directly to the computer through an analog-to-digital comparator for a direct measurement of the arc voltage. In either case, one or both signals 113 and 114 could be supplied to the computer as an interrupt, or the computer could use polling techniques to poll the detector 115.

The weld power source 106 may also be implemented in known manner using commercially available components. It will be appreciated by those skilled in the art that the power source bandwidth must be sufficient to produce a reasonably faithful reproduction of the command signal and that, in this regard, the combined inductance of the power source and weld circuit cabling must be minimized so as to achieve fast rise and fall times for the current output of the weld power source. On the other hand, minimizing the power source inductance makes it more difficult to sustain the arc at low currents, and thus for some applications, a swinging inductor (not shown) may be included in the weld current circuit in order to provide a power source inductance that is relatively high at low currents and relatively low at high currents.

FIGS. 2 and 3 illustrate a specific welding method that can be implemented on the system of FIG. 1. In particular, the method of FIGS. 2 and 3 is suitable for use in short-arc welding processes, in which the consumable electrode 110 is continuously fed into a molten puddle formed on the workpiece, and the process alternates between a short-circuiting phase, in which material being transferred from the electrode to the workpiece extends across and therefore short-circuits the gap between the electrode and the workpiece, and an arcing phase in which power supplied to the electric arc 107 melts the electrode causing a molten ball or droplet to form at the arcing end, the molten ball advancing toward the workpiece until it contacts the molten puddle causing a short circuit. During the short-circuiting phase, high amplitude welding current is used to produce a magnetic pinch effect and cause the molten droplet to be pinched off and drawn into the puddle, breaking contact with the electrode. When contact is broken, the arc is re-formed between the electrode and the puddle, and the arcing phase is repeated as previously described. This process continues in a repetitive or cyclic fashion, alternating between arcing and short-circuiting phases.

During each portion of the process, the weld power source 106 delivers weld current to the sliding electrode 110 in response to the weld current command signal 105 generated by the waveform generator 101 in accordance with the weld-current amplitude profile data 102. In particular, as shown in FIG. 2, the waveform generator generates a waveform having a predetermined number of segments, each with a predetermined duration (Time) and amplitude (Current) given by entries in the table shown in FIG. 3. The waveform is modified by the short circuit signal 113, which indicates the beginning of the short circuit phase, the short circuit being detected by weld voltage amplifier and detector 115 using any of numerous methods of short circuit detection. Each time a short circuit is detected, the waveform generator begins outputting a fixed waveform corresponding to the waveform illustrated in FIGS. 2 and 3. At the end of the tenth segment, the waveform generator starts another cycle beginning at segment T1.

It will of course be appreciated by those skilled in the art that the short arc waveform shown in FIG. 2 is illustrative in nature, and that it may be varied as necessary to achieve a desired result or to match parameters of the welding process such as the electrode feed-rate, as will be described in more detail below. For example, the number of segments might be more or less than ten, and the amplitude and duration of the segments may be programmed to fit any desired profile. In any case, each segment is programmed to deliver the corresponding current for the corresponding duration specified in the columns of the table shown in FIG. 3. The trigger column defines the event used to start the corresponding segment, which in this case is the completion of a previous interval or, in the case of segment 1, the completion of segment 10.

FIGS. 4 and 5 illustrate an alternative method of controlling the weld-current during pulsed-spray consumable electrode processes, in which the arc is intended to be maintained throughout the entire pulsation cycle. In this case, the waveform only has five segments, and segment 1 is started when segment 5 ends.

The method illustrated in FIGS. 2–5, in which the weld-current waveform is entirely pre-programmed, may be varied, in accordance with another preferred embodiment of the invention, by using one of the feedback signals 113 and 114 as a trigger for one of the segments in the weld-current amplitude waveform. For example, in the case of a short-circuit waveform having ten segments and corresponding to the waveform illustrated in FIG. 2, the trigger for the first segment may be provided by signal 113 upon detection of a short-circuit by the weld voltage amplifier and detector 115, rather than upon completion of the tenth segment, and the duration of the tenth segment may be programmed to continue until a short circuit occurs.

It will of course be appreciated that reducing the weld current amplitude upon detection of a short-circuit is well known. The present invention does not concern the weld current profile itself, but rather lies in supplying the short-circuit detection signal to a waveform generator and triggering one of plurality of predetermined waveform segments in response to the signal, as opposed to supplying the signal to a circuit device that reduces the weld-current. The invention may thus be applied to any short-circuit current profile, as well as to any other periodic or cyclical weld current profile known, or that may become known, to those skilled in the art.

Figures 6, 7:
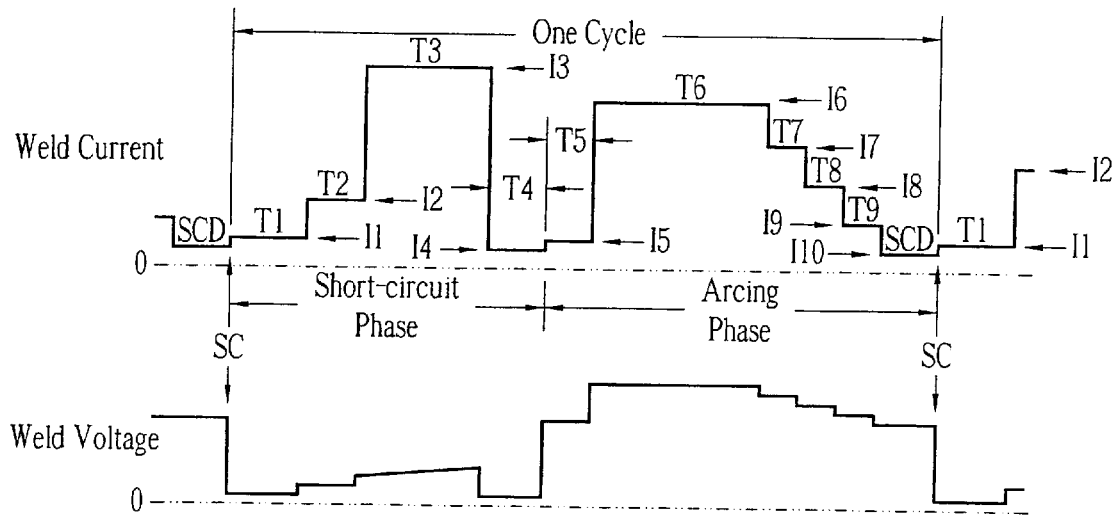
FIG. 6 illustrates an alternative short-circuit arc welding current profile generated by the waveform generator of FIG. 1, together with a corresponding arc voltage profile.
FIG. 7 is a table of amplitude and time values corresponding to the current profile of FIG. 6.

In a variation of the method illustrated in FIGS. 6 and 7 which takes into account the phenomenon of incipient shorts, the first segment may be re-triggered not only upon initial establishment of a short-circuit, but also upon premature re-arcing, as indicated by signal 114. This would have the effect of extending the duration T1 of low amplitude segment 1 until a stable short-circuit was established. Alternatively, instead of waiting for re-arcing, it may be desirable to simply re-trigger the first segment each time a short-circuit is detected, so that the current will remain low until a stable short-circuit has been established, i.e., until inchoate shorting ceases.

Figures 8, 9:
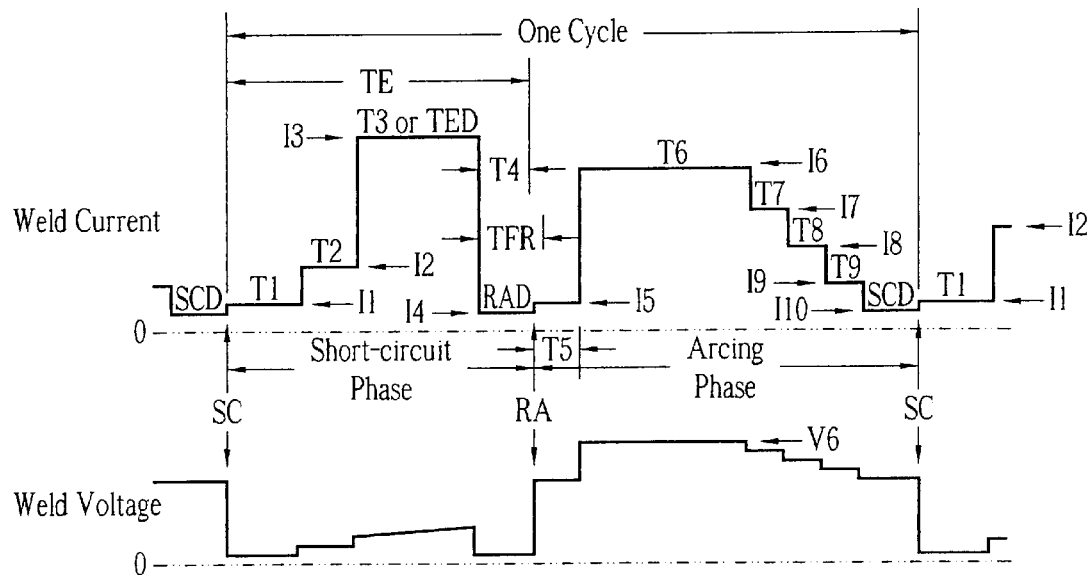
FIG. 8 illustrates yet another alternative short-circuit arc welding current profile generated by the waveform generator of FIG. 1, together with the corresponding arc voltage profile.
FIG. 9 is a table of amplitude and time values corresponding to the current profile of FIG. 8.

Turning to FIGS. 8 and 9, which also apply specifically to short-circuit arc welding and may be implemented using the apparatus illustrated in FIG. 1, the waveform of FIG. 6 is further modified by adding three additional triggers to the short circuit trigger SC. The first additional trigger is based on an arcing time estimate (indicated as TE in FIG. 8 and in the "Trigger" column of FIG. 9) derived from the timing of previous short-circuit and re-arcing events, and in particular from the duration of the time interval between the beginning of the short circuit phase and the beginning of a non-incipient arcing event, i.e., a time estimate of the duration of the short-circuit portion of the welding process. This time estimate may be based on measurements collected over several preceding cycles and averaged, or otherwise processed, to obtain the time estimate. Once estimate TE has been determined, the waveform generator calculates the estimated short circuit duration, less the fixed duration T4 of the fourth segment and uses this calculated value (TE minus T4) to trigger the start of segment 4 which precedes the end of the short circuit cycle, permitting the duration of the high amplitude segment which occurs during the short circuit cycle to be automatically adjusted based on data gathered from previous cycles. The term "T3 or TED" in FIG. 9 indicates that upon gathering sufficient data to determine TE, the duration of segment 3 is to be automatically adjusted by the start of the next segment based on TE, i.e., the duration of segment 3 is no longer fixed but is automatically "time estimate determined" (TED).

In the illustrated table arrangement, the second trigger RA is normally the trigger that would be used to determine the duration of segment 4, and is based on the occurrence of an actual re-arcing event. Initially, segment 5 is triggered, and the duration of segment 4 determined, by predetermined time interval T4. Upon gathering sufficient data so that updated values for TE are forthcoming, RA is used to end segment 4 and trigger segment 5. Therefore, under normal circumstances, the duration of segment 4 is automatically determined by RA events, i.e., it is "re-arcing determined" as indicated by the term RAD in FIG. 9.

By estimating the onset of re-arcing based on historical data, this implementation of the invention has the particular advantage of eliminating the need for necking or pinch-off detection, and therefore of eliminating the need for costly high-power switching elements of the type required to facilitate rapid current decay in systems that utilize necking detection. In prior short circuit arc welding systems, it was necessary to anticipate the re-arcing time by detecting narrowing of the material forming the short circuit just before breakage, so as to provide sufficient time to adjust the current to one that maintains the arc. Necking detectors generally employ differentiation or rate detection methods, which increase sensitivity to electrical noise, such as the noise produced by the sliding contact with the electrode. In contrast, re-arcing detection is simpler and far less prone to noise because re-arcing produces a very large and sudden increase in arc voltage. By using historical data based on the actual re-arcing time, the need for a necking detector and special power switching elements is eliminated and yet prediction of the re-arcing time may actually be made more accurate. If desired, the historical data can be averaged over more than one cycle to further enhance estimated re-arcing time.

A further trigger for segment 5 is a fixed, predetermined time interval TFR that is greater than time interval T4 and that triggers segment 5 in the event that a re-arcing event does not occur within the time provided for by TFR. This sets the maximum amount of time that the weld current will remain at that which is commanded during segment 4 and permits recovery from the failure to re-arc, also known as a stub-out, by increasing the current amplitude from I4 to I5. It is noted that RA, i.e., re-arcing, may occur during segment 3, in which case segment 4 is simply eliminated.

Alternatively, in case of a stub-out, it is possible to modify the waveform illustrated in FIGS. 8 and 9 by immediately beginning segment 6 upon occurrence of a stub-out, in which case the trigger for segment 6 in FIG. 9 would be modified to read "Prior or TFR" and the trigger for segment 5 would be modified to read "Prior or RA."

The exact amplitude and duration values included in the tables shown in FIGS. 3, 5, 7, and 9 will depend on a number of factors, including electrode diameters, feed-rates, material types and welding gas types. Each controller that implements the invention will need to be provided with separate tables for each of these variables, for example by storing multiple tables retrievable based on a selected electrode feed-rate, and multiple sets of feed-rate-related tables for each of the commonly used electrode diameters, electrode material types, welding gas types, and/or any other parameter that affects the weld-current. The manner in which the current profile tables are stored may of course be varied in numerous ways, for example by assigning each table a code, with each parameter represented by one of the digits or letters in the code.

If the number of possible combinations of weld parameters is greater than the number of tables that can conveniently be programmed and stored, it is also possible according to a variation of the above principles, to create tables by interpolation, for example by interpolating amplitude and duration values for electrode feed-rates that are between the electrode feed-rates associated with existing tables.

Figures 10, 11:
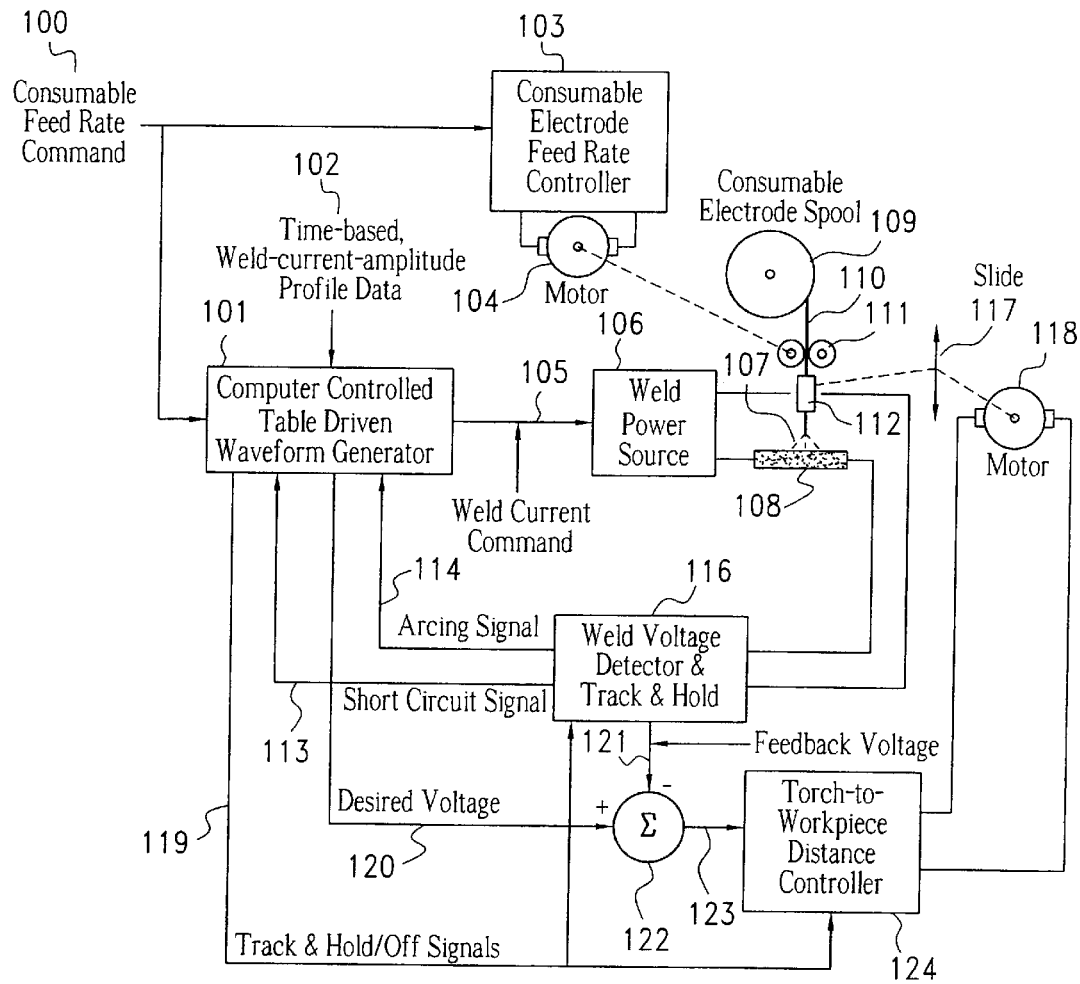
FIG. 10 is a schematic diagram of an arc welding system constructed in accordance with the principles of a second preferred embodiment of the invention.
FIG. 11 is a table of amplitude and time values corresponding to the current profile of FIG. 8 and generated by the system of FIG. 10 rather than the system of FIG. 1.

The waveform illustrated in FIG. 8 may alternatively be achieved using the system shown in FIG. 10, rather than the one illustrated in FIG. 1, and the table illustrated in FIG. 11 rather than the table illustrated in FIG. 9, which adds a distance control function. In particular, the system illustrated in FIG. 10 adds a voltage/distance feed back loop circuit which receives a negative feedback voltage signal 121 from the weld voltage detector and adjusts the torch-to-workpiece distance based on an error signal 123 generated by comparator 122 in response to a difference between the feedback voltage signal 121 and a voltage command signal 120 retrieved by the waveform generator 101 from the current command table. The error signal is amplified and applied to torch-to-workpiece distance controller 124, which controls motor 118 to move contact or slide 117 and an attached welding torch (not shown) and thereby change the effective torch-to-workpiece distance until the error signal disappears.

The advantage of this arrangement is that the torch-to-workpiece distance servo operation is based on arc value sensed during the desired interval with servo operation continuing on this sensed value for at least a portion of the remainder of the welding cycle, simplifying programming of the distance controller and avoiding complex interactions between current and distance loops that would complicate control. Normally, distance control sensing is only activated during the high-current segment of the arcing portion of the short-circuit weld cycle, when the weld voltage is constant and before a short circuit is likely to form. It will of course be appreciated that the summing junctions and/or the voltage detector and "track and hold" (so-named because as it is displayed in FIG. 10, it holds the feed-back voltage to the last value obtained near the end of segment 6 during segments other than segment 6) may be implemented as either digital or analog components, with analog-to-digital or digital-to-analog converters included as necessary to provide signal compatibility.

The system and method of the invention are not limited to short-circuit arc welding processes, but instead may be used with any consumable electrode welding process, as well as with non-consumable electrode processes amenable to control by variable timing of fixed or predetermined amplitude segments. For example, in the case of pulsed spray consumable electrode processes, in which the weld current must be adjusted to optimize the arc voltage, signals 113 and 114 are not used. Instead, as illustrated in FIG. 12, a voltage signal 125 is substituted. After an initial stabilization interval during which the first amplitude segment is triggered by completion of the fifth segment, a measured arc voltage signal is used to trigger the first segment of the pulsed-spray cycle, the duration (VCD) of the fifth segment being the duration necessary to maintain a programmed weld voltage V1 in view of the feedback voltage signal 125. Measurements of the arc voltage are only taken during segment 1, and may be based on the last measurement or on an average of measurements from previous cycles. If the weld voltage is higher than Vs., then the duration of segment 5 is lengthened, decreasing the average current and therefore the electrode consumption rate until the voltage drops down to V1. If the weld voltage is lower than V1, then the duration of segment 5 is shortened, increasing the average current and therefore the electrode consumption rate until the voltage rises up to V1.

Having thus described a preferred embodiment of the invention in sufficient detail to enable those skilled in the art to make and use the invention, it will nevertheless be appreciated that numerous variations and modifications of the illustrated embodiment may be made without departing from the spirit of the invention. The system and methods described above could be applied to the generation of profiles for current, voltage, or energy, or any combination thereof, for example, by terminating a current segment when the programmed energy level has been attained. Alternatively or additionally, the events that trigger portions of the current profile could be events unrelated to short circuit or arcing, including for example, sidewall dwell intervals measured during torch cross-seam oscillation in a pulsed waveform welding process.

It is therefore intended that the invention not be limited by the above description or accompanying drawings, but that it be defined solely in accordance with the appended claims.

We claim:

1. A system for controlling a weld-current in an arc welding apparatus, comprising a waveform generator arranged to output a control signal to a weld-current power supply, the control signal being derived from a digital reference waveform made up of constant amplitude segments having variable durations and at least two different predetermined amplitudes.

2. A system as claimed in claim 1, further comprising a detector for detecting an electrical parameter of an arc, wherein the detector is connected to the waveform generator and the waveform generator is arranged to vary a duration of at least one of the segments based on feedback from the detector.

3. A system as claimed in claim 2, wherein the electrical parameter is selected from the group consisting of current, voltage, or power.

4. A system as claimed in claim 3, wherein the electrical parameter is voltage.

5. A system as claimed in claim 2, wherein the detector varies the waveform based on data measured during at least one earlier weld cycle.

6. A system as claimed in claim 2, wherein the welding apparatus is a short-circuit arc welding apparatus.

7. A system as claimed in claim 6, wherein the duration is varied based on data gathered by the detector over at least one preceding cycle.

8. A system as claimed in claim 2, wherein the welding apparatus is a pulsed arc welding apparatus.

9. A system as claimed in claim 8, wherein the waveform is adjusted based on feedback from an arc-voltage detector during at least one of the segments.

10. A system as claimed in claim 1, wherein the waveform generator is arranged to retrieve the reference waveform from a memory containing a plurality of stored waveforms.

11. A system as claimed in claim 10, wherein the reference waveform is retrieved based on a selected electrode feed-rate.

12. A system as claimed in claim 10, wherein the reference waveform is retrieved based on a selected electrode feed-rate and additional parameters selected from the group consisting of electrode diameters, electrode material types and welding gas types.

13. A system for controlling a weld-current in an arc welding apparatus, comprising a waveform generator arranged to output a control signal to a weld-current power supply, the control signal being derived from a reference waveform consisting of segments having predetermined amplitudes and variable durations, wherein the welding apparatus is a short-circuit arc welding apparatus, and wherein the waveform is adjusted by triggering a lust low amplitude segment upon detection that a short circuit has been established.

14. A system as claimed in claim 13, wherein the first low amplitude segment is re-triggered each time a short circuit is established during each low amplitude segment, thereby taking into account incipient shorts.

15. A system as claimed in claim 13, wherein the first low amplitude segment is re-triggered upon detection of re-arcing during each low amplitude segment, thereby taking into account incipient shorts.

16. A system for controlling a weld-current in an arc welding apparatus, comprising a waveform generator arranged to output a control signal to a weld-current power supply, the control signal being derived from a reference waveform consisting of segments having predetermined amplitudes and variable durations; and a detector for detecting an electical parameter of an arc, wherein the detector is connected to the waveform generator and the waveform generator is arranged to vary a duration of at least one of the segments based on feedback from the detector, wherein the welding apparatus is a short-circuit arc welding apparatus, wherein the duration is varied based on data gathered by the detector over at least one preceding cycle, wherein the data gathered by the detector over at least one preceding cycle is historical data indicative of re-arcing, and wherein the waveform generator begins a low amplitude arc-sustaining segment just prior to an estimated re-arcing time derived from the historical data.

17. A system for controlling a weld-current in an arc welding apparatus, comprising a waveform generator arranged to output a control signal to a weld-current power supply, the control signal being derived from a reference waveform consisting of segments having predetermined amplitudes and variable durations, wherein the waveform generator is arranged to retrieve the reference waveform from a memory containing a plurality of stored waveforms, and wherein the waveform generator is further arranged to interpolate waveforms not included in the plurality of stored waveforms.

18. A system for controlling a weld-current in an arc welding apparatus, comprising:
a waveform generator arranged to output a control signal to a weld-current power supply, the control signal being derived from a digital reference waveform having segments of different amplitude; and a detector for detecting an electrical parameter of an arc, wherein the detector is connected to the waveform generator and the waveform generator is arranged to vary durations of selected said waveform segments in order to synchronize the waveform to events occurring during a weld cycle based on feedback from the detector.

19. A system as claimed in claim 18, wherein the electrical parameter is selected from the group consisting of current, voltage, or power.

20. A system as claimed in claim 18, wherein the electrical parameter is voltage.

21. A system as claimed in claim 18, wherein the detector synchronizes the waveform based on data measured during at least one earlier weld cycle.

22. A system as claimed in claim 18, wherein the welding apparatus is a short-circuit arc welding apparatus.

23. A system as claimed in claim 18, wherein the welding apparatus is a pulsed arc welding apparatus.

24. A system as claimed in claim 18, wherein the waveform generator is arranged to retrieve the reference waveform from a memory containing a plurality of stored waveforms.

25. A system as claimed in claim 24, wherein the reference waveform is retrieved based on a selected electrode feed-rate.

26. A system as claimed in claim 24, wherein the reference waveform is retrieved based on a selected electrode feed-rate and additional parameters selected from the group consisting of electrode diameters, electrode material types and welding gas types.

27. A system for controlling a weld-current in an arc welding apparatus, comprising:
a waveform generator arranged to output a control signal to a weld-current power supply, the control signal being derived from a reference waveform; and a detector for detecting an electrical parameter of an arc, wherein the detector is connected to the waveform generator and the waveform generator is arranged to synchronize the waveform to events occurring during a weld cycle based on feedback from the detector, wherein the waveform generator is arranged to retrieve the reference waveform from a memory containing a plurality of stored waveforms, and wherein the waveform generator is further arranged to interpolate waveforms not included in the plurality of stored waveforms.

28. A method of controlling a weld-current in an arc welding process, comprising the steps of deriving a control signal for a weld current power supply from a digital reference waveform made up of constant amplitude segments having variable durations and at least two different predetermined amplitudes, and supplying the control signal to the weld current power supply.

29. A method as claimed in claim 28, further comprising the steps of detecting an electrical parameter of an arc and varying a duration of at least one of the segments based on the detecting step.

30. A method as claimed in claim 29, wherein the electrical parameter is selected from the group consisting of current, voltage, or power.

31. A method as claimed in claim 29, wherein the electrical parameter is voltage.

32. A method as claimed in claim 29, wherein the step of varying the duration comprises the step of varying the duration based on data measured during at least one earlier weld cycle.

33. A method as claimed in claim 29, wherein the welding process is a short-circuit arc welding process.

34. A method as claimed in claim 33, wherein the duration is varied based on data gathered by the detecting step over at least one preceding cycle.

35. A method as claimed in claim 28, wherein the welding process is a pulsed arc welding process.

36. A method as claimed in claim 35, wherein the waveform is adjusted based on feedback from an arc-voltage detector during at least one of the segments.

37. A method as claimed in claim 28, further comprising the step of retrieving the reference waveform from a memory containing a plurality of stored waveforms.

38. A method as claimed in claim 37, wherein the reference waveform is retrieved based on a selected electrode feed-rate.

39. A method as claimed in claim 37, wherein the reference waveform is retrieved based on a selected electrode feed-rate and additional parameters selected from the group consisting of electrode diameters, electrode material types and welding gas types.

40. A method of controlling a weld-current in an arc welding process, comprising the steps of deriving a control signal for a weld current power supply from a reference waveform consisting of segments having predetermined amplitudes and variable durations; supplying the control signal to the weld current power supply; and triggering a first low amplitude segment of the waveform upon detection that a short circuit has been established.

41. A method as claimed in claim 40, wherein the first low amplitude segment is re-triggered each time a short circuit is established during each low amplitude segment, thereby taking into account incipient shorts.

42. A method as claimed in claim 40, wherein the first low amplitude segment is re-triggered upon detection of re-arcing during each low amplitude segment, thereby taking into account incipient shorts.

43. A method of controlling a weld-current in an arc welding process, comprising the steps of deriving a control signal for a weld current power supply from a reference waveform consisting of segments having predetermined amplitudes and variable durations; supplying the control signal to the weld current power supply; detecting an electrical parameter of an arc; and varying a duration of at least one of the segments based on the detecting step, wherein the welding process is a short-circuit arc welding process, the duration is varied based on data gathered by the detecting step over at least one preceding cycle, and wherein the data gathered by the detecting step over at least one preceding cycle is historical data indicative of re-arcing, and further comprising the step of triggering a low amplitude arc-sustaining segment just prior to an estimated re-arcing time derived from the historical data.

44. A method of controlling a weld-current in an arc welding process, comprising the steps of retrieving a reference waveform consisting of segments having predetermined amplitudes and variable durations from a memory containing a plurality of stored waveforms; deriving a control signal for a weld current power supply from the retrieved reference waveform; and supplying the control signal to the weld current power supply; and further comprising the step of interpolating waveforms not included in the plurality of stored waveforms.

45. A method for controlling a weld-current in an arc welding apparatus, comprising the steps of:

outputting a control signal to a weld-current power supply, the control signal being derived from a digital reference waveform having segments of different amplitude;

detecting an electrical parameter of an arc; and varying durations of selected said segments in order to synchronize the waveform to events occurring during a weld cycle based on results of the detection.

46. A method as claimed in claim 45, wherein the electrical parameter is selected from the group consisting of current, voltage, or power.

47. A method as claimed in claim 45, wherein the electrical parameter is voltage.

48. A method as claimed in claim 45, wherein the waveform is synchronized based on data measured during at least one earlier weld cycle.

49. A method as claimed in claim 45, wherein the welding apparatus is a short-circuit arc welding apparatus.

50. A method as claimed in claim 45, wherein the welding apparatus is a pulsed arc welding apparatus.

51. A method as claimed in claim 45, further comprising the step of retrieving the reference waveform from a memory containing a plurality of stored waveforms.

52. A method as claimed in claim 51, wherein the reference waveform is retrieved based on a selected electrode feed-rate.

53. A method as claimed in claim 51, wherein the reference waveform is retrieved based on a selected electrode feed-rate and additional parameters selected from the group consisting of electrode diameters, electrode material types and welding gas types.

54. A method for controlling a weld-current in an arc welding apparatus, comprising the steps of:

retrieving a reference waveform from a memory containing a plurality of stored waveforms;

outputting a control signal to a weld-current power supply, the control signal being derived from the reference waveform;

detecting an electrical parameter of an arc; and synchronizing the waveform to events occurring during a weld cycle based on results of the detection, and further comprising the step of generating, by interpolation, waveforms not included in the plurality of stored waveforms.

* * * * *

UNITED STATES PATENT AND TRADEMARK OFFICE
CERTIFICATE OF CORRECTION

PATENT NO. : 6,794,608 B2  
DATED : September 21, 2004  
INVENTOR(S) : Dale A. Flood et al.

Page 1 of 1

It is certified that error appears in the above-identified patent and that said Letters Patent is hereby corrected as shown below:

Column 11,  
Line 63, change "Vs." to -- V1 --.

Signed and Sealed this

Eleventh Day of January, 2005

JON W. DUDAS  
*Director of the United States Patent and Trademark Office*

UNITED STATES PATENT AND TRADEMARK OFFICE
CERTIFICATE OF CORRECTION

PATENT NO.     : 6,794,608 B2
DATED          : September 21, 2004
INVENTOR(S)    : Dale A. Flood et al.

It is certified that error appears in the above-identified patent and that said Letters Patent is hereby corrected as shown below:

Column 13,
Line 4, change "lust" to -- first --.

Signed and Sealed this

Twelfth Day of April, 2005

JON W. DUDAS
*Director of the United States Patent and Trademark Office*